W. J. FOX.
SELF WINDING COUNTER SPOOL.
No. 107,031.  Patented Sept. 6, 1870.
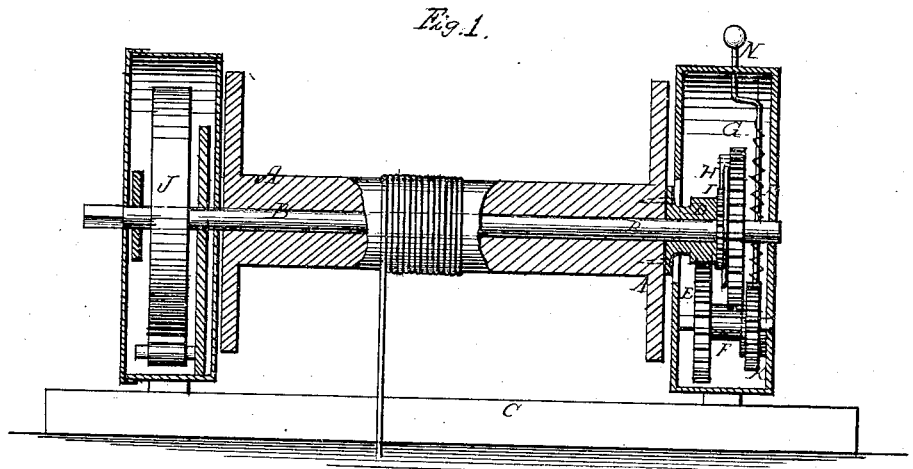
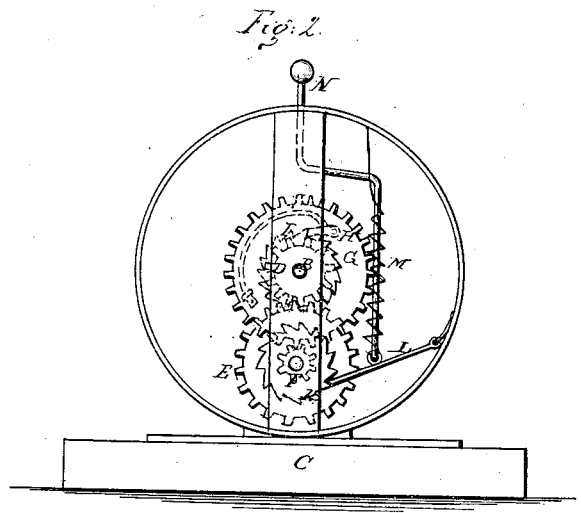
Witnesses:  Inventor:

United States Patent Office.

WILLIAM J. FOX, OF MORRISANIA, NEW YORK.

Letters Patent No. 107,031, dated September 6, 1870.

IMPROVED SELF-WINDING COUNTER-SPOOL.

The Schedule referred to in these Letters Patent and making part of the same.

*To all whom it may concern:*

Be it known that I, WILLIAM J. FOX, of Morrisania, in the county of Westchester and State of New York, have invented a new and useful Improvement in Self-winding Counter-Spool; and I do hereby declare that the following is a full, clear, and exact description thereof, which will enable others skilled in the art to make and use the same, reference being had to the accompanying drawing forming part of this specification, in which—

Figure 1 is a vertical longitudinal section of my improved counter-spool.

Figure 2 is an end view of the same, showing the gearing.

Similar letters of reference indicate corresponding parts.

My invention has for its object to furnish an improved counter-spool, for holding cord to be used for tying up packages and other uses, and which shall be so constructed that, when the end of a ball of cord is attached to the spool, the spool will revolve and wind the cord upon it; and It consists in the construction and combination of the various parts of the spool, as hereinafter more fully described.

A is the spool upon which the cord is wound, and which is placed and revolves upon a shaft, B, which revolves in supports attached to the stand C.

D is a gear-wheel, placed upon the shaft B, the hub of which is extended so as to pass through the support in which the said shaft revolves, and be securely attached to the end of the spool A, so as to revolve with said spool.

The teeth of the wheel D mesh into the teeth of the larger gear-wheel E, the journals of which revolve in the supports attached to the stand C.

With the gear-wheel E is rigidly connected a small gear-wheel, F, the teeth of which mesh into the teeth of the gear-wheel G, which works loosely upon the shaft B, and which is provided with a spring-pawl, H, which takes hold of a ratchet-wheel, I, formed upon or attached to the gear-wheel D.

To the other end of the shaft B is attached one end of the spring J, which is coiled around the said shaft B, and the other end of which is secured to the support in which the said shaft revolves.

By this construction, when the spool A is revolved in unwinding the cord, the gearing D E F G H I revolves the shaft B and coils up the spring J, so that, when the cord is wholly unwound from the spool, the spring J will be sufficiently coiled to wind another ball of cord upon the spool A.

The end of the shaft B to which the spring J is attached is squared off, to adapt it to receive a key for winding up the said spring J when necessary, the spring pawl H allowing the shaft B to be turned for this purpose, without carrying the gearing and spool with it.

With the gear-wheels E F is rigidly connected a ratchet-wheel, K, upon the teeth of which the pawl L takes hold to prevent the shaft and spool from being revolved by the spring J at any other time than when required.

The pawl L is held against the teeth of the ratchet-wheel K by a coiled or equivalent spring, M.

With the pawl L is also connected a rod or lever, N, extending out into such a position that it may be conveniently operated to remove the pawl L, when it is desired to have the spring J revolve the spool A, to wind up the cord.

The spring and gearing connected with the ends of the shaft B should be incased with suitable caps or covers to protect them from the dust and from being accidentally obstructed.

Having thus described my invention,

I claim as new and desire to secure by Letters Patent—

An improved self-winding counter-spool, formed by the combination of the spool A, shaft B, gear-wheels D E F G, spring pawl H, ratchet-wheel I, spring J, ratchet-wheel K, pawl L, coiled or equivalent spring M, and rod or lever N, with each other, substantially as herein shown and described, and for the purpose set forth.

The above specification of my invention signed by me this 5th day of August, 1870.

WILLIAM J. FOX.

Witnesses:
GEO. W. MABEE,
JAMES T. GRAHAM.